United States Patent [19]

Oudard et al.

[11] Patent Number: 5,704,982

[45] Date of Patent: Jan. 6, 1998

[54] TECHNIQUE FOR DEPOSITING COATINGS BY PYROLYSIS/DECOMPOSITION OF PRECURSOR GAS OR GASES

[75] Inventors: Jean-Francois Oudard, Thiescourt; Pascal Crampon, Margny Les Compiegne; Patrice Jacquet, Pierrefonds, all of France

[73] Assignee: Saint-Gobain Vitrage, Courbevoie, France

[21] Appl. No.: 534,801

[22] Filed: Sep. 27, 1995

[30] Foreign Application Priority Data

Sep. 27, 1994 [FR] France ............... 94 11505

[51] Int. Cl.6 .............................. C23C 16/00
[52] U.S. Cl. .............. 118/718; 118/715; 65/60.1
[58] Field of Search .................. 118/715, 718; 65/60.1

[56] References Cited

U.S. PATENT DOCUMENTS

| 2,698,812 | 1/1955 | Schladitz | 117/47 |
|---|---|---|---|
| 4,123,244 | 10/1978 | Leclercq | 65/60.1 |
| 4,188,199 | 2/1980 | Van Laethem | 65/60.1 |
| 4,351,267 | 9/1982 | Kalbskopf | 118/718 |
| 4,361,284 | 11/1982 | Kalbskopf | 239/422 |
| 4,446,815 | 5/1984 | Kalbskopf | 118/718 |
| 4,469,045 | 9/1984 | Chesworth | 118/718 |
| 4,537,795 | 8/1985 | Nath | 427/39 |
| 4,573,431 | 3/1986 | Sarkozy | 118/725 |
| 4,627,989 | 12/1986 | Feuerstein | 427/10 |
| 4,793,282 | 12/1988 | Greenberg | 118/667 |
| 5,041,150 | 8/1991 | Grundy | 65/60.51 |
| 5,105,761 | 4/1992 | Charlet | 118/723 |
| 5,136,975 | 8/1992 | Bartholomew | 118/715 |
| 5,262,356 | 11/1993 | Fuji | 437/225 |
| 5,269,847 | 12/1993 | Anderson | 118/715 |

FOREIGN PATENT DOCUMENTS

| 0 499 523 | 8/1992 | European Pat. Off. . |
| 0 499 524 | 8/1992 | European Pat. Off. . |
| 0 518 755 | 12/1992 | European Pat. Off. . |
| 2 348 166 | 11/1977 | France . |
| WO 94/24331 | 10/1994 | WIPO . |

Primary Examiner—R. Bruce Breneman
Assistant Examiner—Jeffrie R. Lund
Attorney, Agent, or Firm—Oblon, Spivak, McClelland, Maier & Neustadt, P.C.

[57] ABSTRACT

A nozzle for distributing at least one current of precursor gases onto a surface of a moving glass substrate by pyrolysis/decomposition reaction includes a nozzle body, a principal gas feed system for feeding at least one current of precursor gases into the nozzle of the body, and an auxiliary gas feed system independent of the principal gas feed system for feeding at least one of the precursor gases to the nozzle body in the proximity of the principal gas of the nozzle body for locally modifying the chemical composition of the principal gas. The auxiliary gas flow into the nozzle body is controlled at a flow rate which is variable in time.

14 Claims, 1 Drawing Sheet

TECHNIQUE FOR DEPOSITING COATINGS BY PYROLYSIS/DECOMPOSITION OF PRECURSOR GAS OR GASES

BACKGROUND OF THE INVENTION

1. Field of the Invention

This invention relates to a technique for depositing coatings obtained by pyrolysis/decomposition reaction of gases or mixtures of gases known as precursors onto hot moving substrates of the float glass ribbon type. The invention concerns more particularly the device for carrying out this technique, usually known by the term "CVD" (chemical Vapour Deposition) and notably the nozzle which makes it possible to distribute and to channel towards the substrate to be coated the precursor gas current or currents adapted for pyrolysing or decomposing in appropriate manner on contact.

2. Description of the Related Art

There are already known, notably from patent application EP-A-O 490 523, EP-A-O 499 524 and EP-A-O 518 755, distribution nozzles of this type, suitable for being placed inside the enclosure of a float bath transversely to the axis of travel of the glass ribbon sliding on the surface of the molten tin bath. These nozzles comprise an inlet chamber supplied with appropriate gas. The gas flow emitted from this inlet chamber is then guided along an injection channel having a U-section (or two channels in the case of patent application EP-A-O 499 524) and defined by the wall faces of a central block flanked by "upstream" and "downstream" heels as defined relative to the axis of travel of the ribbon. The gas flow in this way follows a laminar flow path along the surface of the glass along this axis, and along this path the pyrolysis of the precursor gases forming part of this flow takes place. The gas flow, when depleted, is removed by suction devices at the exit from the guiding channel.

This deposition technique is very interesting from the economic aspect, because it enables coatings to be produced directly and continuously on the ribbon of float glass, with devices that are simpler and deposition conditions that are less constraining than those, for example, of the deposition techniques using vacuum of the cathodic sputtering type.

In addition, the coatings deposited by CVD as a general rule have a high adhesion to the substrate and satisfactory quality and satisfactory durability.

The float glass ribbon to be covered, however, usually has a width of at least 2 meters, notable of the order to 3 to 4 meters. It is therefore across this width, which is considerable, that the distribution nozzles must distribute the gaseous flow in the most homogeneous manner possible so as to assure, at least transversely to the axis of travel of the ribbon, a certain constancy in the quality and/or thickness of the deposited coating.

In the case of the nozzles described in the aforementioned three patent applications, the distribution takes place in an inlet chamber situated in the upper part, this chamber being fed with gas by means of a supply duct carrying the precursor gas or gases in suspension in an inert gas of the nitrogen type and perforated by uniformly distributed orifices over the entire part of it that is inside the chamber and transverse to the axis of travel of the ribbon. This type of gas feed to the nozzles has the merit of being simple to construct and to control, because it uses only a single duct, on which the composition and flow rate of the gas are to be regulated. It has in addition been found perfectly well suited for depositing coatings of standard quality. In contrast, it can be found inadequate if the production of extremely uniform coatings is demanded, notably in terms of thickness, in that with such a system it is not possible to ensure that each of the gas jets that leaves the orifices of the duct has exactly the same characteristics as the other, in terms of flow rate in particular.

SUMMARY OF THE INVENTION

The invention has the object of alleviating this disadvantage by optimizing the method of feeding gas to the distribution nozzles used in the deposition techniques of the CVD type, notably so that it shall guarantee an improved homogeneity in the distribution of the gas flows used without excessively sacrificing the simplicity of the process.

The invention uses a distribution nozzle for precursor gas current or currents or mixtures of precursor gases onto the surface of a moving glass substrate of the float glass ribbon type, the gas or gases being adapted for forming, on contact with the substrate, a coating by a reaction of the pyrolysis/decomposition type. The nozzle is equipped with a feed system comprising, first, a feed of gas termed a principal feed to the nozzle body and using a common gas supply means for each of the currents to be generated. In the sense of the invention, "principal" signifies that it is this feed that provides basically for the supply of the quantity of precursor gases necessary for the deposition of a coating of given mean thickness.

In addition, the feed comprises also a feed of gas termed auxiliary feed, autonomous with respect to the principal feed and which is intended for locally modifying the chemical composition of the current or currents generated by the feed termed principal feed. To achieve this, this auxiliary feed can generate, in or in proximity to said current or currents, at least one gaseous vein containing at least one precursor gas necessary for the forming of the coating. In the sense of this invention, "auxiliary" denotes that this feed provides to a rather minor extent for the feed to then nozzle, notably by carrying only a single one of the necessary precursors.

Preferably, this secondary feed is used for the purpose of correcting or preventing any irregularity in the thickness or the quality of the deposited coating. This secondary feed, by modifying locally the chemical composition of the current or currents will be able to make up, where necessary, the local inhomogeneities in this current or these currents. The gaseous vein previously referred to then fulfils the role of a "compensating" vein, which advantageously contains at least one of the precursor gases carried by the principal feed and which has a composition, flow rate and localization that are appropriate for achieving the correction of these inhomogeneities: "compensating" implies, in fact, that it has the function of eliminating or at the very least attenuating the disparities of distribution of the principal feed by "injection", where this should prove necessary, the appropriate quantity and composition of gases. This does not, however, means that it cannot also have the function of completing quantitatively the supply of precursors necessary for obtaining a coating of the desired composition and thickness.

By "doubling", by "assisting" in this way the principal feed by a corrective auxiliary feed, the invention makes it possible to obtain coatings that have extremely small variations in thickness, measured transversely to the axis of travel of the substrates, which therefore tends towards a notable improvement in their quality. In fact, when the substrate is a float glass ribbon and the coating is deposited with interferential thicknesses, any too significant variation in thickness will lead at least to defects of an optical nature, such as rather inelegant iridescence effects.

It may be emphasised that the solution provided by this invention for solving the problem of inhomogeneity in the feed of gas to the nozzles is original and surprising in more than one way. In fact, the first idea that would come to the mind of the person skilled in the art would be to attempt to act directly upon the feed known as "principal", rather than to create a second feed in parallel. Furthermore, there was nothing to guarantee the effectiveness of the veins or streams of gas generated by the "auxiliary" feed according to this invention, because on the contrary it might have been expected that theses veins, which are close to the principal currents, would be "diluted" without managing to correct their inhomogeneity locally in a precise and controlled manner.

However, the feed system still retains a certain simplicity in operation, in so far as it is possible to use without modification, as "principal" feed, conventional feeds having a single supply duct. Specifically, the invention does not require that the existing installations for CVD deposition be drastically altered, which is always a point of advantage when operating on an industrial scale.

It is, furthermore, easy to provide means for modulating, finely and accurately, the flow rate, composition and localization of the gas veins of the auxiliary feed, because the auxiliary feed carries a minor quantity of precursor gases and therefore uses gas flow rates that are in general much smaller than those involved in the duct of the principal feed.

Preferably, current or currents and vein or veins of gas generated by the feed system of the nozzle have laminar flow, which optimizes the path of the precursor gases along the surface of the substrate to be coated and ensures as far as is possible that the veins of gas are confined in or alongside the gaseous streams, hence their effectiveness.

The distribution nozzle is particularly well suited for forming depositions of coatings on a float glass ribbon, by being disposed above the ribbon and transversely to it. The nozzle if equipped, in this configuration in its upper part, with as many gas inlet chambers supplied by the principal gas feed as there are currents to be generated.

According to the invention, it is advantageous to choose a principal feed of relatively simple design. Thus, this feed may comprise, for each of the currents to be generated, a common gas supply duct feeding into a plurality of inlets that lead into the appropriate inlet chamber. One preferred form of embodiment consists in that this feed comprises, for each current to be generated, a pipe carrying the appropriate precursor gas (or mixture of precursor gases), and a portion of which, notably the end, is perforated by uniformly distributed orifices and is disposed along the appropriate inlet chamber. Each orifice thus serves as a gas supply, the distribution and number of the orifices creating a large number of gas jets sufficiently close to one another to form a curtain of gas, a "current" in the sensor of the invention.

For the auxiliary feed to be able to fulfil as well as possible its corrective/compensating function for that current or those currents that may have local inhomogeneities, it is preferably for the inlet chamber (or at least one of them if there are several) to be supplied with gas by this auxiliary feed as well. In this way the proximity between "principal" current and auxiliary vein or veins is assured.

The auxiliary feed may be designed, for example, in two different ways: it may comprise a plurality of gas inlets with a configuration that remains fixed during operation of the nozzle, leading ad hoc into the inlet chamber and uniformly distributed along the length of said chamber. The feeds may then, together or alternatively, generate where and when necessary the gas vein or veins suitable for homogenizing the gas current in question.

In may also comprise at least one gas inlet, leading into the inlet chamber, but mounted movable during the operation of the nozzle, notably along an axis parallel to the length of said chamber. By translatory movements, the feeds may continue to "intervene" where this is necessary while being greatly reduced in number compared with the preceding case.

With regard to the type of gas which the auxiliary feed is intended for carrying, here again notably there are two methods of operating, in the case in which the principal feed carries a mixture of precursor gases, and not a single precursor gas, which is the most common case.

The auxiliary feed may be adapted for generating veins of the same gaseous mixture as that carried by the principal feed, optionally in the same relative ratios between precursors. This therefore amounts to the vein or veins of gas of the auxiliary feed locally augmenting the gas flow rate in the current issuing from the principal feed, for the purpose of compensating locally a drop in flow in said current. Making the flow rate more uniform in this way then leads to the desired result, which is to make the thickness of the coating uniform, because the yield of the pyrolysis/decomposition reaction, and therefore the thickness of the deposited coating, depends upon the quantity of precursor games used.

The auxiliary feed may also be adapted for generating gas veins of a composition different from that of the gas current issuing from the principal feed, and notably may comprise only one of the precursor gas or gases or even a necessary precursor gas that is not carried in the principal feed. The gas vein of the auxiliary feed then locally modifies the proportion between precursors of the principal current, which will enable the pyrolysis yield to be augmented locally, implying a reaction between precursors. The same result is then achieved as in the preceding case, if the precursor of the auxiliary feed is appropriately chosen, which precursor may notably be either the simplest to carry, or that which "governs" the stoichiometry of the reaction between precursors (when one of the precursors is used in excess by comparison with the other, for example).

It will be self-evident that any "intermediate" solution, consisting of using in the auxiliary feed more than one of the precursors of the principal feed, but not necessarily all the precursor gases nor necessarily in the same proportions, can just as well be envisaged within the framework of this invention. It is then simply a matter of dosing, according to the nature of the precursors and the nature of the coating to be deposited, in order to adjust to the optimum the way in which the gas veins will locally modify the pyrolysis reaction of the precursors of the principal gas current.

For the auxiliary feed to be able to fulfil its function, it is important to provide means for controlling the flow rate, of the valve type, on the inlet or each of the inlets of gas to this feed, so that the flow rate or flow rate profile of the gas veins that they generate can be controlled and regulated. One preferred form of embodiment then consists of a plurality of gas inlets, leading into the inlet chamber for the gas current that it is desired to make more uniform, at points uniformly distributed along the length of said chamber, each inlet being equipped with a valve adapted for supplying 0 or 100% of a predetermined gas flow, and possibly any intermediate flow rate between these two extreme values. The auxiliary feed may thus operate in "on/off" manner, with complete closure of the gas inlets in those zones where it is not necessary to generate gas veins because the current has a satisfactory degree of uniformity there. The auxiliary feed may equally well operate in such a way that all or at least a portion of the gas inlets continually deliver a certain mean flow rate (which remains low by comparison with the flow rate of the gas inlets to the principal feed), which then may be locally reduced or increased. In this way a certain flow rate "profile" is created by the totality of the gas veins.

The auxiliary feed advantageously takes into account the time factor, in so far as the inhomogeneities that may occur in the current or currents generated by the principal feed evolve during the operation of the nozzle, an evolution that may consist of a local displacement of the inhomogeneity of the current, and/or a decrease or increase in said inhomogeneity, which manifests itself by a corresponding evolution of irregularity of thickness of the deposited coating.

The regulation of the auxiliary feed over time may be done by hand, by simple manual control of the valves of the gas inlets in response to a detection "downstream" of the nozzle of a local thickness defect of the deposited coating.

The regulation of the auxiliary feed may also be automated, which may enable finer and/or more rapid modifications in adjustment of the flow rates to be carried out in response to a detection of a defect in the coating. For this purpose there may then be installed an automatic timewise regulating system for the valves of the gas inlets to the auxiliary feed, by means of a control unit connected to at least one instrument for measuring the quality or thickness of the coating "downstream" of the nozzle.

The invention can be applied to the deposition by pyrolysis of gases for very diverse coatings, for example coatings for films based upon Si, O, C, such as those described in patent application EP-A-O 518 755. In this case, it is preferred that the principal feed shall generate a gaseous current comprising silicon precursor or precursors and carbon precursor or precursors and that the auxiliary feed shall generate, if required, one or more veins of gas comprising only the one or the other of the two types of precursors, and preferably the carbon precursor or precursors. It may also be applied to the deposition of films of metallic nitride of the TiN type, as described in French patent application FR-93/09916 filed on 12 Aug. 1993 and in French patent application FR-93/13023 filed on 2 Nov. 1993.

The invention also has as its object a method of using the distribution nozzle described above, a method which provides for feeding the nozzle with a principal feed equipped with a common supply duct for each current to be distributed with a given flow rate for given coating characteristics, notably thickness. Said method provides, in addition, an auxiliary feed to the nozzle equipped with gas inlets, each delivering a gas flow rate that is adjustable in time between 0 and 100% of a given flow value.

BRIEF DESCRIPTION OF THE DRAWING

The details and advantageous characteristics of this invention can now be seen from the following non-limiting forms of embodiment, illustrated by means of the figures.

DETAILED DESCRIPTION OF THE PREFERRED EMBODIMENT

Figure 1:
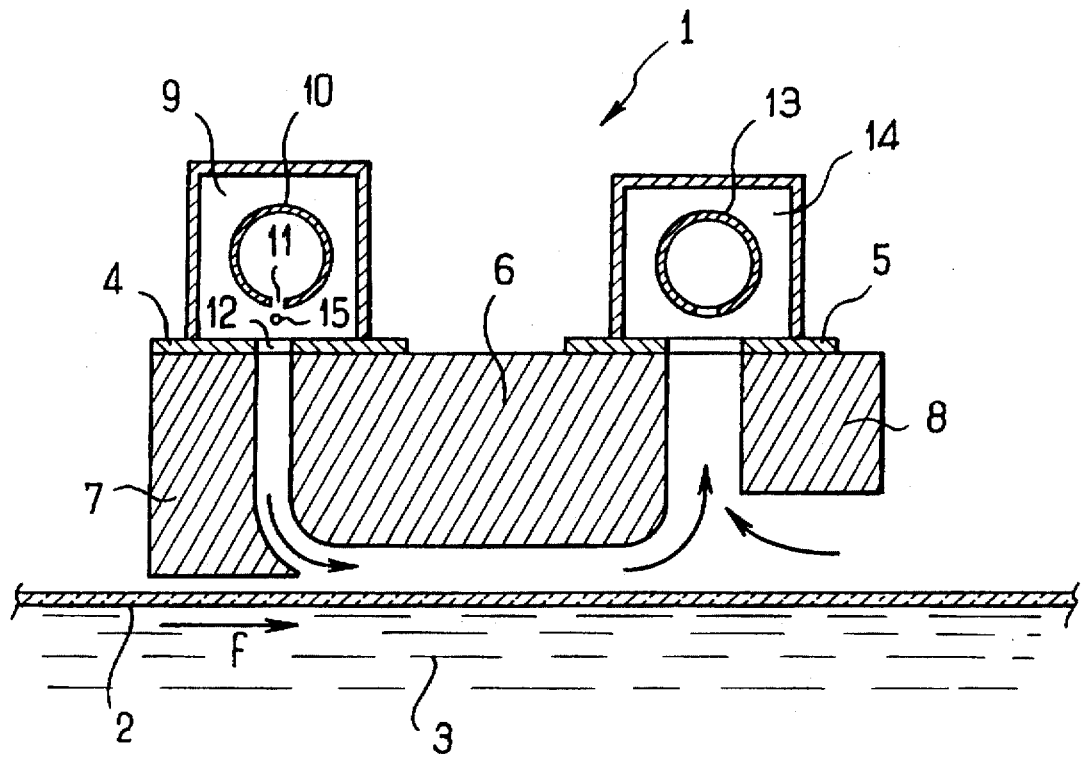
FIG. 1 is a schematic view in cross-section of a distribution nozzle according to this invention.

FIG. 1 therefore shows a distribution nozzle for the coating deposition by CVD onto float glass. It is an optimization of the nozzle described in patent application EP-A-O 518 755, mentioned above, in so far as it is equipped with the gas feed forming the subject of the present invention. For more information about the general functioning of such a nozzle, reference may advantageously be made to that patent application or one of those already mentioned.

FIG. 1 shows the nozzle 1 in the operating position inside the enclosure of a float bath, the enclosure not being shown. The glass ribbon 2 can be seen here, floating on the surface of the molten tin bath 3. Above the ribbon 2, in a zone in which it has already acquired a dimensional stability, the nozzle 1 is mounted transversely to the ribbon. It extends across the entire width of the ribbon. It comprises an inverted U-section profile, of which the edges of the vertical walls are fixed to horizontal brackets 4, 5 and which comprises a central block 6, a heel termed upstream heel 7 and a heel termed downstream heel 8 ("upstream" and "downstream" refer here to the direction of travel of the glass indicated by the arrow). These walls define a guiding channel for the gas, which can be broken down into a vertical injection channel between upstream heel 7 and central block 6, a horizontal channel between central block 6 and the surface of the glass, and another vertical channel between central block 6 and downstream heel 8. This channel is supplied with precursor gas by an inlet chamber 9, in which is housed a gas feed duct 10, perforated throughout its length by uniformly spaced orifices 11 and which forms a continuation of a pipe connected to a suitable gas source. The assembly of the gas jets issuing from these orifices creates a gaseous current which glows out through the opening 12.

Normally, the current generated in this way and containing the precursor or precursors in suspension in an inert gas is relatively uniform throughout its length, which corresponds to the width of the glass ribbon 2. It is not possible, however, to guarantee an absolutely uniform distribution through the orifices 11, nor that they will all have an exactly identical diameter nor that they can all distribute the same gas flow rate, depending upon whether they are situated at the one or the other of the ends of the duct 10 housed in the inlet chamber 9.

Inhomogeneities of flow rate can therefore appear locally in the current flowing out through the slit 12 and these can lead to irregularities in the thickness of the coating deposited. The invention therefore provides a feed of auxiliary gas in the form of a plurality of small inlet ducts 15 for at least one of the precursor gases, which ducts each have a very small diameter by comparison with the diameter of the principal feed duct 10 and which lead into the inlet chamber 9 at different points uniformly distributed along the length of said chamber. The configuration and method of operation of these inlet ducts will be seen in greater detail from FIG. 2.

In addition, to complete the description of the nozzle in general, it should be pointed out that a suction device 13 is disposed in the discharge chamber 14 disposed at the end of the last vertical position of the gas guide duct, for the purpose of sucking away the gaseous current depleted by the quantity of precursor gas which has reacted on contact with the hot glass to deposit the coating. In this way the gas is prevented from spilling into the atmosphere of the float bath, which is a carefully controlled mixture of $H_2/N_2$.

Figure 2:
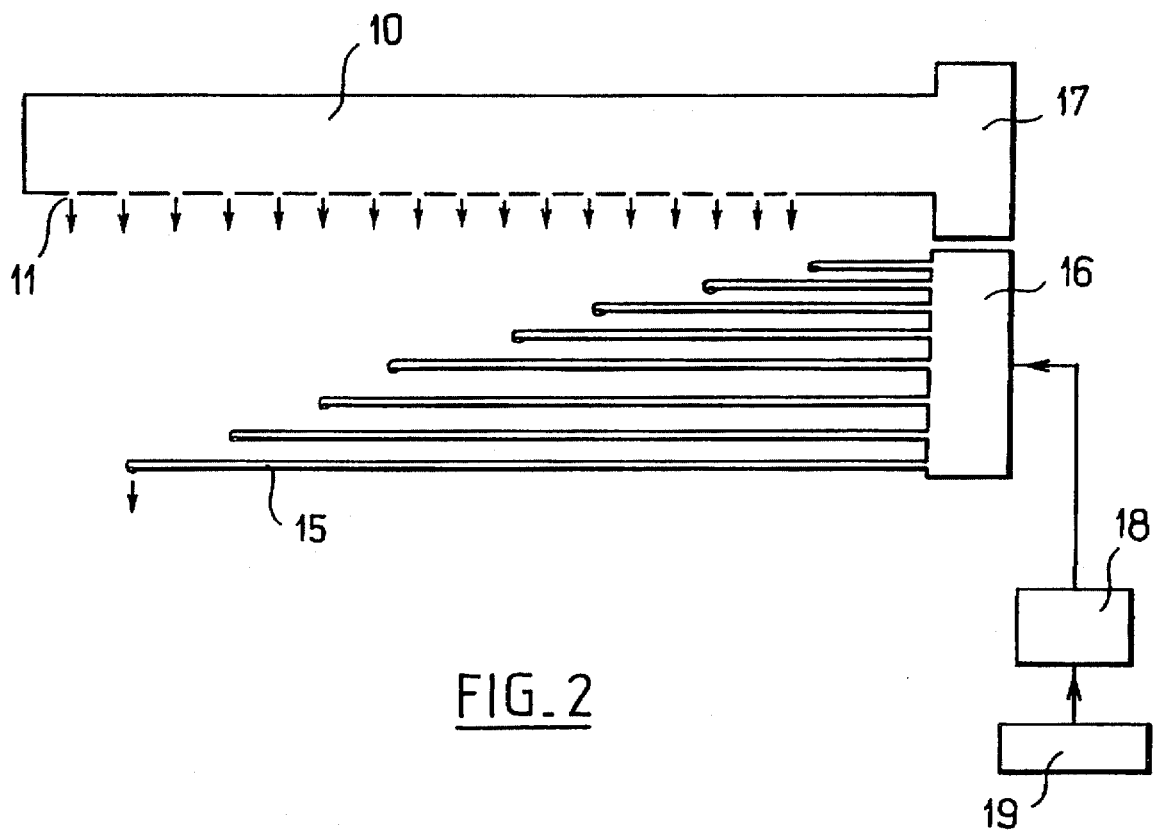
FIG. 2 is a schematic view in longitudinal section of the inlet chamber for the gases to the nozzle according to FIG. 1 and of the two methods of supplying it with gas.

If reference is now made to FIG. 2 (highly schematic), the relative arrangement in the inlet chamber of the principal feed duct 10 and of the large number of very small auxiliary feed ducts 15 can be seen more accurately. It will be evident that this is only one non-limiting example of configuration.

Thus the ducts 15 could also be disposed along an axis not parallel to that of the principal duct 10 and, for example, could be disposed perpendicularly to the latter. The important feature is that the gas jets leaving the orifices 11 shall be close to those which can be emitted by the ducts 15, and that a uniform distribution of emission orifices from ducts 15 can correspond to a uniform distribution of orifices 11. The duct 10 is situated above the series of small ducts 15, which are all connected, outside the chamber, to a gas source 15 different from the gas source 17 supplying the duct 10. The duct 10 is supplied with a mixture of precursor gases in a given proportion and at a given flow rate, in suspension in nitrogen, for the purpose of producing a coating of given type and thickness.

From each of the orifices 11 there emerges a gas jet. Furthermore, each of the ducts 15 is adapted for delivering also a gas jet of given composition and the flow rate of which is regulated by means of electrically operated valves from a control unit 18, connected to at least one transverse measuring device 19 for measuring the thickness of the deposited coating downstream of the nozzle. The configuration of the outlet orifices of the ducts 15 is such that the gas jets which they can emit have the same sense and direction as those emitted by the orifices 11. It is possible to provide a single instrument continuously scanning the width of the glass ribbon or a plurality of instruments at several points across said width.

As soon as the control unit detects, in the readings supplied by the device or devices 19 of reflectometer type, a local difference in thickness exceeding a given tolerance threshold, it triggers the opening of the valve or valves of at least one of the ducts 15 so that they shall generate a vein or stream of gas intended for compensating the inhomogeneity in the current coming from the duct 10, which has caused the localized reduction in thickness of the coating. The vein of gas will become "enclosed" in the current but does not become "diluted" there, or only slightly diluted, which ensures its effectiveness.

This manner of feed has been applied for producing, in conformity with patient application EP-A-0 516 755, a coating based upon Si, O and C.

The duct 10 is fed with a mixture of $SiH_4$ and ethylene in suspension in nitrogen, each of the ducts 15 being capable of supplying only ethylene in nitrogen.

For depositing a coating of 100 nanometers thickness and a refractive index of 1.65, the duct 10 is fed from the source 17 with gas at the following volumetric flow rates for each of the gases of the mixture:

$Q_1$ ($SiH_4$)=from 7 to 15 liters per minute $Q_2$ ($N_2$)=from 40 to 80 liters per minute $Q_3$ ($C_2H_4$)=from 40 to 80 liters per minute.

In theory, therefore, each of the gases issuing from the orifices 11 of the duct has flow rates $Q'_1$, $Q'_2$ and $Q'_3$ of $SiH_4$, $N_2$ and $C_2H_4$, which are exactly equal to the ratio of $Q_1$, $Q_2$ and $Q_3$ divided by the number of orifices 11. Now, variations in flow rates can exist from one jet to another. As son as the transverse thickness profile of the coating shows, as a consequence of these variations in flow rate, variations in thickness exceeding 5% of the means thickness, the control unit 18 opens the valve of the duct 15 concerned to promote locally the reaction between precursors by locally increasing the proportion of ethylene in the gas current, and thus eliminate the local reductions in thickness: each duct 15 can generate a jet of gas with a flow rate of ethylene ranging from 0 to 5 liters per minute.

The control unit 18 (or the operator if a control loop is not used) may advantageously use pre-established nomograms for determining what is the flow rate of ethylene to be imposed in the appropriate duct 15 for correcting a detected variation in thickness as soon as it exceeds a given tolerance threshold, in the present case fixed arbitrarily at 5%.

In this way a coating is obtained that is particularly uniform in thickness, any irregularity being very rapidly corrected by the "auxiliary" feed according to this invention without any need to perturn the "principal" feed to the nozzle.

Furthermore, it will be self-evident that the "auxiliary" feed of this invention has been optimized in order to guarantee uniformity in the thickness of the coating deposited. It would however be equally possible, without departing from the scope of this invention, to use this auxiliary feed for creating, in this case in a deliberate and controlled manner, gradients in the thickness or chemical composition of the deposited coating, at least transversely to the axis of travel of the substrate, if it should prove necessary or advantageous to produce coatings having such characteristics.

We claim:

1. A nozzle for distributing at leas tone current of precursor gases onto a surface of a moving glass substrate of the float glass ribbon type, the precursor gases being adapted for forming, on contact with the substrate, a coating by pyrolysis/decomposition reaction, comprising:

a nozzle body;

principal gas feed means for feeding a principal gas to said nozzle body, said principal gas comprising the at least one current of the precursor gases; and auxiliary gas feed means independent of said principal gas feed means for feeding an auxiliary gas to said nozzle body in the proximity of a principal gas in said nozzle body for locally modifying the chemical composition of the principal gas, said auxiliary gas comprising at least one of said precursor gases.

2. The nozzle of claim 1 wherein said nozzle body comprises a laminar flow nozzle.

3. The nozzle of claim 1 wherein said principal gas feed means extends transverse to a direction of movement of the glass substrate and comprises a gas inlet chamber for each current of precursor gas.

4. The nozzle of claim 3 including, for each current of precursor gas, a common gas supply duct in said gas inlet chamber, each said supply duct having a plurality of orifices.

5. The nozzle of claim 4 wherein said common gas supply duct comprises a pipe having said orifices extend uniformly in the direction transverse to a direction of movement of the glass substrate.

6. The nozzle of claim 5 wherein said auxiliary gas feed means supplies said at least one of said precursor gases to said principal gas feed means.

7. The nozzle of claim 6 wherein, for each current of precursor gas, said auxiliary gas feed means comprises a plurality of ducts having outlets distributed uniformly along the length of said inlet chamber.

8. The nozzle of claim 7 including valves at each of said ducts of said auxiliary gas feed means for controlling the flow of gas through said auxiliary gas feed means.

9. The nozzle of claim 8 wherein said valves comprise manual valves.

10. The nozzle of claim 8 including:

means for measuring a characteristics of the coating applied to the substrate; and a control unit receiving signals from said measuring means and controlling said valves.

11. The nozzle of claim 6 wherein, for each current of precursor gas, said auxiliary gas feed means comprises a movable duct having an outlet positionable along the length of said inlet chamber.

12. The nozzle of claim 1 wherein said at least one of said precursor gases comprises said precursor gases supplied by said principal gas feed means.

13. The nozzle of claim 1 wherein said at least one of said precursor gases comprises only one of said precursor gases.

14. The nozzle of claim 1 including valves for controlling the flow of gases through said principal and auxiliary gas feed means.

* * * * *